United States Patent [19]

Johnson

[11] Patent Number: 4,482,462

[45] Date of Patent: Nov. 13, 1984

[54] MECHANICAL DEVICES FOR CHEMICAL TREATMENT OF FLUIDS

[75] Inventor: Steven M. Johnson, Dexter, Mich.

[73] Assignee: Federal-Mogul Corporation, Southfield, Mich.

[21] Appl. No.: 456,909

[22] Filed: Jan. 10, 1983

[51] Int. Cl.³ .............................................. C02B 1/18
[52] U.S. Cl. .................................. 210/752; 210/765; 210/206; 210/207
[58] Field of Search ............... 210/752, 764, 765, 749, 210/207, 205, 101, 206

[56] References Cited

U.S. PATENT DOCUMENTS

| | | | |
|---|---|---|---|
| 417,046 | 12/1889 | Kendrick | 210/101 |
| 1,210,772 | 1/1917 | Deutsch | 239/239 |
| 2,540,102 | 2/1951 | Cushman | 239/357 |
| 2,667,646 | 2/1954 | Monteino | 210/101 |
| 3,136,716 | 6/1964 | Kitter | 210/754 |
| 3,161,588 | 12/1964 | Zsoldos | 210/753 |
| 3,232,869 | 2/1966 | Gard | 210/754 |
| 3,288,708 | 11/1966 | Cordle | 210/754 |
| 3,316,173 | 4/1967 | Goodenough | 210/755 |
| 3,346,446 | 10/1967 | Zsoldos | 210/753 |
| 3,425,790 | 2/1969 | Sloan | 210/753 |
| 3,436,345 | 4/1969 | Goodenough et al. | 210/754 |
| 3,462,363 | 8/1969 | Mills | 210/754 |
| 3,727,760 | 4/1973 | Soriano | 210/205 X |
| 3,772,189 | 11/1973 | Kreusch et al. | 210/753 |
| 3,772,193 | 11/1973 | Nelli et al. | 210/205 X |
| 3,817,860 | 6/1974 | Lambert et al. | 210/753 |
| 3,899,425 | 8/1975 | Lewis | 210/206 |
| 3,923,665 | 12/1975 | Lambert et al. | 210/501 |
| 4,090,320 | 5/1978 | Loiacono | 46/9 |
| 4,187,183 | 2/1980 | Hatch | 210/501 |
| 4,190,529 | 2/1980 | Hatch | 210/753 |

Primary Examiner—John Adee
Attorney, Agent, or Firm—Robert F. Hess

[57] ABSTRACT

A device for treating a process fluid contained within a closed chamber with a chemical reactant including a compartment for containing the chemical reactant and a port for allowing flow of the process fluid therethrough. The device is characterized by a recirculation mechanism, such as a piston, for alternately drawing a portion of the process fluid into the compartment through the port to bring the portion of the process fluid into direct contact with the chemical reactant and dissolve and/or react a portion of the chemical reactant into the portion of the process fluid and then forcing the portion of the process fluid out of the compartment through the port to circulate the dissolved chemical reactant throughout the remaining process fluid within the closed chamber.

A method of treating the process fluid is also disclosed and includes the steps of disposing a portion of the device below the surface of the process fluid so that the port of the device is within the process fluid. The method is characterized by the step of recirculating the process fluid through the device by alternately drawing a portion of the process fluid into the compartment through the port to bring the portion of the process fluid into direct contact with the chemical reactant and dissolve and/or react a portion of the chemical reactant into the portion of the process fluid and then forcing the portion of the process fluid out of the first compartment through the port to circulate the dissolved chemical reactant throughout the remaining process fluid within the closed chamber.

23 Claims, 3 Drawing Figures

U.S. Patent  Nov. 13, 1984  4,482,462
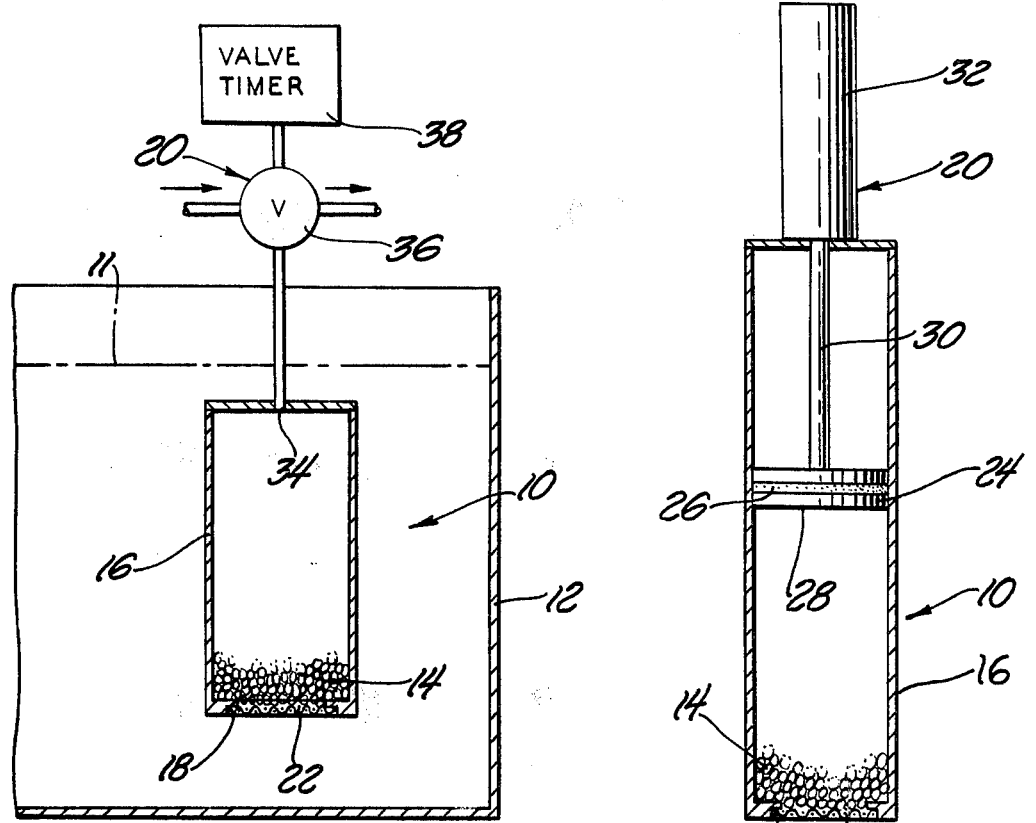
Fig. 1
Fig. 3
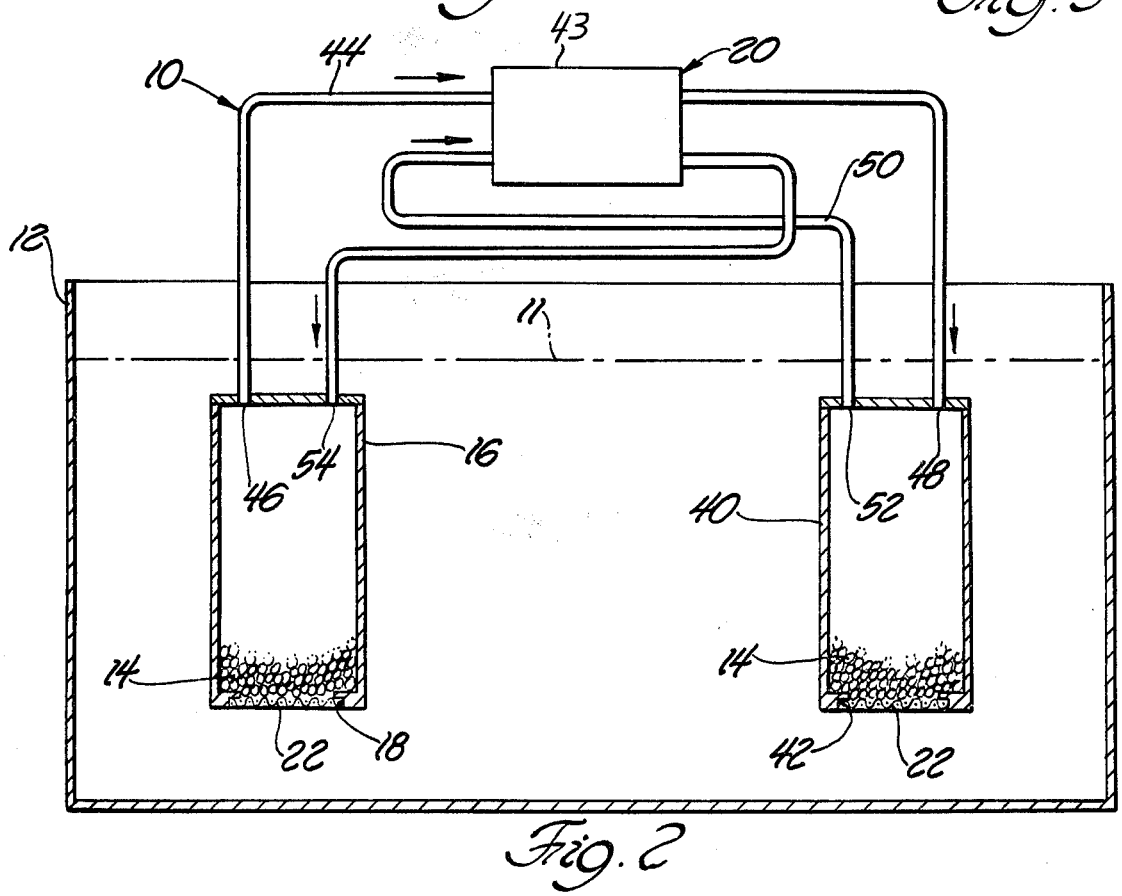
Fig. 2

MECHANICAL DEVICES FOR CHEMICAL TREATMENT OF FLUIDS

BACKGROUND OF THE INVENTION (1) Field of the Invention

The instant invention relates to a device used to treat process fluids with a solid chemical reactant whose fluid concentration is limited by an equilibrium with the process fluid or with a solid chemical reactant that must contact the fluid to chemically control an agent within the fluid. The instant invention is best suited for uses with machining coolants such as water-emulsified oils, synthetic coolants, or semi-synthetic coolants (a mixture of synthetic coolants in water-emulsified oil), plating fluids, cleaning fluids, or other industrial fluids containing undissolved solids.

(2) Description of the Prior Art

The control of microorganisms which contaminate central machining coolant systems has been a major maintenance problem ever since machining coolants have been in use. Prior art methods of controlling organism growth have been found to be inconvenient and time consuming while governmental restrictions on the more effective biocides have accentuated the problem. The remaining biocidal materials in use are very expensive and are readily consumed at high concentrations of microorganisms.

Experimentation has been undertaken to develop an effective apparatus for treating coolants. It has been determined that an effective method is the use of a triiodated quanternary amine anion exchange resin. Experimentation has found this method to be used successfully for water purification. It has been proven effective on fungus, mold, bacteria and virus. The instant invention provides a device which would be used to treat process fluids with such a solid chemical reactant. The device is simple in construction and cost of production, and has been found to be quite effective in use.

SUMMARY OF THE INVENTION

The instant invention provides a device for treating a process fluid contained within a closed chamber with a chemical reactant. The device includes a compartment for containing the chemical reactant and a port for allowing flow of the process fluid therethrough. The device is characterized by including recirculation means for alternately drawing at least a portion of the process fluid into the compartment through the port to bring the portion of the process fluid into direct contact with the chemical reactant to treat the fluid, e.g., dissolving and/or reacting with a portion of the chemical reactant with the portion of the process fluid. The recirculation means then forces the portion of the process fluid out of the compartment through the same port to circulate the dissolved chemical reactant through the remaining process fluid within the closed chamber.

Additionally, the instant invention provides a method of treating a process fluid contained within a closed chamber with the treatment device including the steps of disposing at least a portion of the device below the surface of the process fluid so that the port of the device is within the process fluid. The method is characterized by the step of recirculating the process fluid through the device by alternately drawing at least a portion of the process fluid into the compartment through the port to bring the portion of the process fluid into direct contact with the chemical reactant and to dissolve and/or react a portion of the chemical reactant into the portion of the process fluid. The process fluid is then forced out of the compartment through the same port to circulate the dissolved and/or reacted chemical reactant throughout the remaining process fluid within the closed chamber.

BRIEF DESCRIPTION OF THE DRAWINGS

Other advantages of the present invention will be readily appreciated at the same becomes better understood by reference to the following detailed description when considered in connection with the accompanying drawings wherein:

FIG. 1 is a schematic cross-sectional view of a device for treating a process fluid constructed in accordance with the instant invention and disposed within a chamber containing process fluid;

FIG. 2 is a schematic cross-sectional elevational view of a second embodiment constructed in accordance with the instant invention and disposed within a chamber containing process fluid; and FIG. 3 is a schematic elevational cross-sectional view of a third embodiment constructed in accordance with the instant invention.

DESCRIPTION OF PREFERRED EMBODIMENTS

Three preferred embodiments of the instant invention for treating a process fluid contained within a chamber with a chemical reactant are generally shown at 10 in FIGS. 1 through 3. The three embodiments have common or like components which have like reference numerals and which are described first with the uncommon or unlike components described thereafter.

By way of introduction, the instant invention provides a device 10 for treating a process fluid 11 contained within a chamber or reservoir 12 with a chemical reactant 14. The device 10 includes a compartment 16 for containing the chemical reactant 14. A port 18 disposed at one end of the compartment 16 allows flow of the process fluid 11 therethrough. The device 10 is characterized by recirculation means generally indicated at 20 for alternatively drawing at least a portion of the process fluid 11 into the compartment 16 through the port 18 to bring the portion of the process fluid 11 into direct contact with the chemical reactant 14 and dissolve a portion of the chemical reactant 14 into the portion of the process fluid 11. The recirculation means then forces the portion of the process fluid 11 out of the compartment 16 through the port 18 to circulate the dissolved chemical reactant 14 throughout the remaining process fluid 11 within the compartment 16. Thusly, the contained volume of the fluid 11 within compartment 16 is made to change at a controlled rate to pass the process fluid 11 over the chemical reactant 14. Since the level of fluid 11 is made to rise and fall within compartment 16, and since there is only one port 18, excess fluid 11 enters and exits through the single port 18.

The instant invention includes filtering means comprising a screen 22, which may be a single screen or a plurality of screens, for allowing the flow of the process fluid 11 into the compartment 16 through the port 18, and the flow of the process fluid 11 containing the dissolved and/or reacted chemical reactant 14 out of the compartment 16 through the port 18 while preventing the egress of the remaining undissolved chemical reactant 14 from the compartment 16. The screen 22 is flushed free of contamination at the completion of each cycle of the recirculation means 20. This allows the instant invention to operate in heavy particulate laden fluids 11 that would normally clog flow through cartridges and filters. For example, such contaminants could be metal particles or grindings within the process fluid 11.

As shown in FIG. 3, one embodiment of the recirculation means 20 includes a piston 24 having a sealing ring 26 disposed thereabout between the peripheral surface of the piston 24 and the inner wall of the compartment 16. The bottom surface 28 of the piston 24 defines one wall of the compartment 16. The piston 24 is mounted at the end of a rod 30, the rod being reciprocally actuated preferably by a linear motion device, such as hydraulic or pneumatic cylinder 32, or by mechanical means. Thusly, the piston 24 is reciprocally movable within the compartment 16 to increase and decrease the volume of the compartment 16 for drawing the process fluid 11 into and forcing the process fluid 11 out of the compartment 16.

As shown in FIG. 1, a second embodiment of the instant invention 10 includes a second port 34. In this embodiment of the instant invention the recirculation means 20 includes a valve schematically shown at 36 for controlling the direction of flow of a second fluid, preferably a gas such as ordinary air, through the second port 34 into and out of the compartment 16 thereby forcing the process fluid 11 out of and to draw the process fluid 11 into the compartment 16 through the first port 18. A valve timer schematically shown at 38 automatically controls the opening and closing of the valve 36.

In operation, the volume of the second fluid within the compartment 16 would be made to change at a controlled rate to pass the process fluid 11 over the chemical reactant 14. The volume change would be effected by submerging the compartment 16 below the process fluid level with the screen 22 opening downwardly and allowing the process fluid to equilibrate with the second fluid trapped within the compartment 16. When the fluid level equalizes with the process fluid level, additional amounts of the second fluid would be allowed into the compartment 16 under a lower pressure to force the process fluid 11 out through the first port 18. This cycle is repeated to pass the process fluid 11 over the reactant chemical 14.

A third embodiment of the instant invention is shown in FIG. 2. The device 10 includes a second compartment 40 for containing a chemical reactant 14. The second compartment 40 has a third port 42 for allowing flow of the process fluid 11 therethrough. The device 10 further includes a valve 43 which interconnects first compartment 16 and second compartment 40 for directing alternate flow of the second fluid therebetween. More specifically, a first conduit 44 interconnects an outlet 46 from the first compartment 16 with an inlet 48 of the second compartment 40. A second conduit 50 interconnects an outlet 52 of the second compartment 40 with an inlet 54 of the first compartment 16. Thusly, the valve 43 alternately directs the flow of the second fluid between the first and second compartments 16 and 40 resulting in the alternate rising and falling of the process fluid 11 within these compartments.

The valve 43 shown schematically in FIG. 2 may comprise a turbine fan to supply pressurized air therethrough. Alternately, an aspirator design using a separate source of pressurized air may be substituted for the turbine fan source. In general, any suitable power-driven rotary or other large orifice air handling valve can be used.

The instant invention can be best adapted for the use of a solid chemical reactant in the form of a non-conventional biocide such as an ion exchange resin. A quaternary amine exchange resin, triiodated by immersion in an aqueous solution of potassium iodide and a stoichiometric excess of iodine has demonstrated biocidal activity.

There are two proposed methods of biocidal action that can be attributed to a triiodated exchange resin prepared as indicated. One suggested method is electrostatic force and the other is release of a kinetically controlled quantity of fluid soluble iodine. Microorganism cells having a positively or negatively charged exterior membrane are passed through the negative electrostatic field surrounding the triiodated resin. An attraction or repulsion reaction takes place which tears the cell membrane, thus killing the organism. The second method of biocidal action occurs through iodine release. Ion exchange between the resin and hydroxyl groups (pH dependent) releases iodine according to an equilibrium reaction. This released iodine, soluble in the fluid, reacts with bacteria primarily outside the exchange column, that is, outside of the compartments 16 and 40, in a manner similar to chlorination. The concentration of soluble iodine can be controlled by the chemistry of the triiodated anion exchange resin and the pH of the fluid.

Dermatitis has been associated with high pH and with the presence of moderate to low concentrations of conventional biocides in machining coolants. With the anion exchange control method used combined with the instant invention, lower pH ranges consistent with the functioning of emulsifiers may be used and conventional biocides may be significantly curtailed in frequency of use, thus resulting in a reduced occurrence of dermatitis.

The instant invention, therefore, provides a method of treating the process fluid 11 contained within a chamber or reservoir 12 with a treatment device 10, including disposing of at least a portion of the device 10 below the surface of the process fluid 11 so that the first port 18 of the device 10 is within the process fluid 11. The method is further characterized by the step of recirculating the process fluid 11 through the device 10 by alternately drawing at least a portion of the process fluid 11 into the first compartment 16 through the port 18 to bring the portion of the process fluid 11 into direct contact with the chemical reactant 14 and to dissolve and/or react a portion of the chemical reactant 14 into the portion of the process fluid 11. The process fluid 11 is then forced out of the first compartment 16 through the same port 18 to circulate the dissolved or reacted chemical reactant 14 throughout the remaining process fluid 11 within the chamber 12.

The method further includes the steps of filtering the process fluid flowing into the first compartment 16 through the port 18 to allow the ingress of the process fluid 11 and to allow the egress of the process fluid 11 containing dissolved chemical reactant 14 while preventing the egress of the remaining undissolved chemical reactant 14.

The process fluid 11 is drawn into the first compartment 16 by effectively increasing and decreasing the volume of the compartment 16 to draw the portion of the process fluid 11 into and out of the compartment 16 through the port 18. As shown in FIG. 1, this step is further defined by alternately directing the flow of the second fluid into and out of compartment 16 through a second port 34 to force the process fluid 11 out of compartment 16 through the first port 18 and draw the process fluid into the compartment 16 through the first port 18 respectively. Alternatively, as shown in FIG. 2, this step may be further defined by alternately directing the flow of the second fluid between the first compartment 16 and a second compartment 40, the second compartment 40 containing a chemical reactant 14 and including a third port 42 for allowing the flow of the process fluid 11 therethrough.

The invention has been described in an illustrative manner, and it is to be understood that the terminology which has been used is intended to be in the nature of words of description rather than of limitation.

Obviously, many modifications and variations of the present invention are possible in light of the above teachings. It is therefore to be understood that within the scope of the appended claims wherein reference numerals are merely for convenience and are not to be in any way limiting, the invention may be practiced otherwise than as specifically described.

I claim:

1. A device (10) for treating a process fluid (11) contained within a chamber (12) with a chemical reactant (14), said device (10) comprising: a first compartment (16) for containing the chemical reactant (14), a first port (18) located at one end portion of said first compartment (16) for allowing flow of the process fluid (11) therethrough, and characterized by recirculation means (20) at least partially located externally of said first compartment (16) at a second end portion substantially opposite said one end portion and said first port (18) for cycling the process fluid (11) through said first compartment (16) by alternately drawing only a portion of the process fluid (11) into said compartment (16) through said first port (18) to bring the portion of the process fluid (11) into direct contact with the chemical reactant (14) to treat the portion of the process fluid (11) with a portion of the chemical reactant (14) and then forcing the portion of the process fluid (11) out of said first compartment (16) through said port (18) to circulate the chemical reactant (14) in the treated portion of process fluid (11) throughout the remaining process fluid (11) within the chamber (12), said recirculation means (20) being operative by means independent of this process fluid (11), whereby the cycling of process fluid (11) through the first compartment (16) may be independent of the level of the process fluid (11) within the chamber (12).

2. A device as set forth in claim 1, wherein said recirculation means (20) includes a piston (24) defining one wall of said first compartment (16), said piston (24) being reciprocally movable within said device (10) to increase and decrease the volume of said first compartment (16) for drawing the process fluid (11) into and forcing the process fluid (11) out of said first compartment (16), respectively.

3. A device as set forth in claim 1, wherein said device includes a second port (34) located at a second end portion of the first compartment (16) substantially opposite said one end portion and the first port (18), said recirculation means (20) includes valve means (36) for controlling the direction of flow of a second fluid through said second port (34) into and out of said first compartment (16) to force said process fluid (11) out of and to draw said process fluid (11) into said first compartment (16) through said first port (18), respectively.

4. A device as set forth in claim 1, including a second compartment (40) for containing a chemical reactant (14) and having a third port (42) for allowing flow of the process fluid (11) therethrough, said valve means (20) including a valve member (43) and at least one conduit (44) connecting said valve member (42) between said first and second compartments (16, 40) for alternately directing the flow of the second fluid between said first and second compartments (16, 40).

5. A device as set forth in claim 1, including filtering means (22) for allowing the flow of the process fluid (11) into said first compartment (16) through said first port (18) and the flow of the process fluid (11) containing the chemical reaction (14) out of said first compartment (16) through said first port (18) while preventing the egress of the remaining undissolved chemical reactant (14) from said first compartment (16).

6. A device as set forth in claim 5, wherein said filtering means (22) comprises a screen (22) disposed completely over said first port (18).

7. A device as set forth in claim 5, wherein said recirculation means (20) includes a piston (24) defining one wall of said first compartment (16), said piston (24) being reciprocally movable within said device (10) to increase and decrease the volume of said first compartment (16) for drawing the process fluid (11) into and forcing the process fluid (11) out of said first compartment (16), respectively.

8. A device as set forth in claim 5, wherein said device includes a second port (34) located at a second end portion of the first compartment (16) substantially opposite said one end portion of the first port (18), said recirculation means (20) including valve means (36) for controlling the direction of flow of a second fluid through said second port (34) into and out of said first compartment (16) to force said process fluid (11) out of and to draw said process fluid (11) into said first compartment (16) through said first port (18), respectively.

9. A device as set forth in claim 8, including a second compartment (40) for containing a chemical reactant (14) and having a third port (42) for allowing flow of the process fluid (11) therethrough, said valve means (20) including a valve member (43) and at least one conduit (44) connecting said valve member (43) between said first and second compartments (16, 40) for alternately directing the flow of the second fluid between said first and second compartments (16, 40).

10. A process fluid chamber comprising: a reservoir (12) for containing a predetermined amount of a process fluid (11) and a device (10) adapted to be at least partially disposed within said process fluid (11) for treating the process fluid (11) with a solid chemical reactant (14), said device (10) including a first compartment (16) for containing the chemical reactant (14) and a first port (16) for allowing flow of the process fluid (11) into and out of said first compartment (16) and characterized by recirculation means (20) at least partially located externally of said first compartment (16) at a second end portion substantially opposite said one end portion and said first port (18) for cycling the process fluid (11) through said first compartment (16) by alternately drawing only a portion of the process fluid (11) into said first compartment (16) through said first port (18) to bring the portion of the process fluid (11) into direct contact with the chemical reactant (14) and treat a portion of the chemical reactant (14) with the portion of the process fluid (11) and then forcing the portion of the process fluid (11) out of said first compartment (16)

through said first port (18) out of said first compartment (16) through said first port (18) to circulate the chemical reactant (14) in the treated portion of the process fluid (11) throughout the remaining process fluid (11) within the reservoir (12).

11. A process fluid chamber as set forth in claim 10, wherein said device includes a second port (34) located at a second end portion of the first compartment (16) substantially opposite said one end portion and the first port (18), said recirculation means (20) including valve means (36) for controlling the direction of flow of a second fluid through said second port (34) into and out of said first compartment (16) to force said process fluid (11) out of and to draw said process fluid (11) into said first compartment (16) through said first port (18), respectively.

12. A process fluid chamber as set forth in claim 11, including a second compartment (40) for containing a chemical reactant (14) and having a third port (42) for allowing flow of the process fluid (11) therethrough, said valve means (20) including a valve member (43) and at least one conduit (44) connecting said valve member (43) between said first and second compartments (16, 40) for alternately directing the flow of the second fluid between said first and second compartments (16, 40).

13. A process fluid chamber as set forth in claim 10, including filtering means (22) for allowing the flow of the process fluid (11) into said first compartment (16) through said first port (18) and the flow of the process fluid (11) containing the chemical reactant (14) out of said first compartment (16) through said first port (18) while preventing the egress of the remaining chemical reactant (14) from said first chamber (16).

14. A process fluid chamber as set forth in claim 13, wherein said process filtering means (22) comprises a screen (22) disposed completely over said first port (18).

15. A process fluid chamber as set forth in claim 14, wherein said recirculation means (20) includes a piston (24) defining one wall of said first compartment (16) said piston (24) being reciprocally movable within said device (10) to increase and decrease the volume of said first compartment (16) for drawing the process fluid (11) into and forcing the process fluid (11) out of said first compartment (16), respectively.

16. A process fluid chamber as set forth in claim 14, wherein said device includes a second port (34) located at a second end portion of the first compartment (16) substantially opposite said one end portion and the first port (18), said recirculation means (20) including valve means (36) for controlling the direction of flow of a second fluid through said second port (34) into and out of said first compartment (16) to force said process fluid (11) out of and to draw said process fluid (11) into said first compartment (16) through said first port (18), respectively.

17. A process fluid chamber as set forth in claim 14, wherein said recirculation means (20) includes a piston (24) defining one wall of said first compartment (16) said piston (24) being reciprocally movable within said device (10) to increase and decrease the volume of said first compartment (16) for drawing the process fluid (11) into and forcing the process fluid (11) out of said first compartment (16), respectively.

18. A process fluid chamber as set forth in claim 17, including a second compartment (40) for containing a chemical reactant (14) and having a third port (42) for allowing flow of the process fluid (11) therethrough, said valve means (20) including a valve member (43) and at least one conduit (44) connecting said valve member (43) between said first and second compartments (16, 40) for alternately directing the flow of the second fluid between said first and second compartments (16, 40).

19. A method of treating a process fluid (11) contained within a chamber (12) with a treatment device (10) including a first compartment (16) for containing a chemical reactant and a first port (18) for allowing flow of the process fluid therethrough, said method comprising the steps of: disposing at least a portion of the device (10) below the surface of the process fluid (11) so that the first port (18) located at one end portion of said first compartment (16) of the device (10) is within the process fluid (11), recirculating the process fluid (11) independently of the level thereof within the chamber (12) through the device (10) by repeatedly creating a pressure differential between the one end portion of the first compartment (16) nearest first port (18) and a second end portion substantially opposite thereto, thereby alternately drawing only a portion of the process fluid (11) into the first compartment (16) through the first port (18) to bring the portion of the process fluid (11) into direct contact with the chemical reactant (14) and treating a portion of the chemical reactant (14) with the portion of the process fluid (11), and then forcing the portion of the process fluid (11) out of the first compartment (16) through the first port (18) to circulate the chemical reactant (14) in the treated portion of the process fluid (11) throughout the remaining process fluid (11) within the chamber (12).

20. A method as set forth in claim 19, further including the step of filtering the process fluid (11) flowing into the first compartment (16) through the first port (18) to allow the ingress of the process fluid (11) and to allow the egress of the process fluid (11) containing chemical reactant (14) and prevent the egress of the remaining undissolved or unreacted chemical reactant (14).

21. A method as set forth in claim 20, further defined by the step of effectively increasing and decreasing the volume of the first compartment (16) to draw the part of the process fluid (11) into and out of the first compartment (16) through the first port (18).

22. A method as set forth in claim 21, further defined by alternately directing the flow of a second fluid into and out of the first compartment (16) through a second port (34) located at said second end portion to force the process fluid (11) out of the first compartment (16) through the first port (18) and draw the process fluid into the first compartment (16) through the first port (18), respectively.

23. A method as set forth in claim 22, further defined by alternately directing the flow of the second fluid between the first compartment (16) and a second compartment (42), the second compartment containing a chemical reactant (14) and a third port (42) for allowing flow of the process fluid (11) therethrough.

* * * * *

UNITED STATES PATENT AND TRADEMARK OFFICE
CERTIFICATE OF CORRECTION

PATENT NO. : 4,482,462
DATED : November 13, 1984
INVENTOR(S) : Steven M. Johnson It is certified that error appears in the above-identified patent and that said Letters Patent is hereby corrected as shown below:

Column 1, line 56, after "reactant" delete "through" and insert thereat -- throughout -- .

Column 2, line 9, after "appreciated" delete "at" and insert thereat -- as -- .

Column 4, line 68 after "flow of" delete "the" and insert thereat -- a -- .

Column 6, line 32, after "portion" delete "of" and insert thereat -- and -- .

Column 6, line 55, delete "(16)" and insert thereat -- (18) located at one end portion of said first compartment (16) -- .

Column 7, line 36, after "said" delete "process".

Signed and Sealed this

Second Day of July 1985

[SEAL]

Attest:

DONALD J. QUIGG

*Attesting Officer*   *Acting Commissioner of Patents and Trademarks*